United States Patent
Siconolfi et al.

(10) Patent No.: US 10,489,728 B1
(45) Date of Patent: Nov. 26, 2019

(54) GENERATING AND PUBLISHING A PROBLEM TICKET

(71) Applicant: INTERNATIONAL BUSINESS MACHINES CORPORATION, Armonk, NY (US)

(72) Inventors: Philip Siconolfi, Wappingers Falls, NY (US); Jacky M. Doll, Pleasant Valley, NY (US); Jeffrey Bisti, New Paltz, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/989,346

(22) Filed: May 25, 2018

(51) Int. Cl.
*G06Q 10/06* (2012.01)
*G06F 11/00* (2006.01)
(Continued)

(52) U.S. Cl.
CPC ....... *G06Q 10/063112* (2013.01); *G06F 8/77* (2013.01); *G06N 3/08* (2013.01); *G06Q 10/0631* (2013.01); *G06Q 10/0635* (2013.01); *G06F 11/0709* (2013.01); *G06F 11/0769* (2013.01); *G06F 11/2023* (2013.01); *G06Q 10/06* (2013.01); *G06Q 10/06316* (2013.01); *G06Q 10/063114* (2013.01)

(58) Field of Classification Search
CPC ............... G06Q 10/0635; G06Q 10/06; G06Q 10/063114; G06Q 10/0631; G06Q 10/063118; G06F 11/2252; G06F 11/0709; G06F 11/0769
See application file for complete search history.

(56) References Cited

U.S. PATENT DOCUMENTS 6,260,048 B1 * 7/2001 Carpenter ........... G06F 11/0769
6,389,426 B1 * 5/2002 Turnbull ................ G06Q 10/10
379/201.1

(Continued)

OTHER PUBLICATIONS

David Loewenstern et al., A Learning Feature Engineering Method for Task Assigment, IEEE 2012, [Retrieved on Jul. 1, 2019]. Retrieved from the internet: <URL: https://ieeexplore.ieee.org/stamp/stamp.jsp?tp=&arnumber=6212015> 7 Pages (961-967) (Year: 2012).*

(Continued)

*Primary Examiner* — Anibal Rivera
(74) *Attorney, Agent, or Firm* — Cantor Colburn LLP; Teddi Maranzano

(57) ABSTRACT

Embodiments of the invention are directed to a computer-implemented method that includes generating, by a processor of a problem-tracking system, a problem ticket. The problem ticket describes a problem encountered by a first user, and the problem ticket is assigned to at least one qualified user to resolve. The method also includes receiving additional information relating to the problem from at least one second user. The method also includes storing the received additional information in association with the problem ticket. The receiving and the storing of the additional information occurs while the problem ticket is waiting to be resolved by the at least one qualified user. The method also includes providing the stored received additional information and the problem ticket to the at least one qualified user.

17 Claims, 4 Drawing Sheets

(51) Int. Cl.
*G06F 9/46* (2006.01)
*G06N 3/08* (2006.01)
*G06F 8/77* (2018.01)
*G06F 11/07* (2006.01)
*G06F 11/20* (2006.01)

(56) References Cited

U.S. PATENT DOCUMENTS

| | | | | |
|---|---|---|---|---|
| 7,225,139 | B1* | 5/2007 | Tidwell | G06Q 10/10 705/7.15 |
| 8,224,683 | B2* | 7/2012 | Manos | G06Q 10/0631 705/7.15 |
| 8,903,933 | B1* | 12/2014 | Bellini, III | H04L 29/08837 707/705 |
| 10,175,979 | B1* | 1/2019 | Elwell | G06F 8/71 |
| 2005/0097396 | A1* | 5/2005 | Wood | G06F 11/2252 714/25 |
| 2007/0112947 | A1* | 5/2007 | Anderson | H04L 41/5074 709/223 |
| 2008/0056233 | A1* | 3/2008 | Ijidakinro | H04L 29/06027 370/352 |
| 2009/0055684 | A1* | 2/2009 | Jamjoom | G06F 11/0709 714/26 |
| 2009/0201311 | A1* | 8/2009 | Nielsen | G06Q 10/06 345/594 |
| 2013/0159427 | A1* | 6/2013 | Jahr | H04L 41/5074 709/206 |
| 2013/0332303 | A1* | 12/2013 | Schank | G06Q 30/0641 705/26.4 |
| 2014/0006861 | A1* | 1/2014 | Jain | G06Q 30/01 714/26 |
| 2014/0129536 | A1* | 5/2014 | Anand | G06Q 10/0635 707/706 |
| 2014/0165188 | A1* | 6/2014 | Giblin | H04L 63/10 726/21 |
| 2014/0244330 | A1* | 8/2014 | Hall | G06Q 10/063114 705/7.15 |
| 2014/0282010 | A1* | 9/2014 | Young | G06Q 10/06 715/730 |
| 2015/0302337 | A1* | 10/2015 | Li | G06Q 10/06393 705/7.39 |
| 2015/0317222 | A1* | 11/2015 | Mahindru | G06F 11/2023 714/4.11 |
| 2016/0283889 | A1* | 9/2016 | Shukla | G06Q 10/063114 |
| 2016/0342927 | A1* | 11/2016 | Reznik | G06Q 10/06 |
| 2016/0358297 | A1* | 12/2016 | Alon | G06Q 50/265 |
| 2017/0132557 | A1* | 5/2017 | Venkataraman | G06Q 10/063114 |
| 2017/0212756 | A1* | 7/2017 | Ryali | G06F 8/77 |
| 2017/0330098 | A1* | 11/2017 | Best | G06N 5/045 |
| 2018/0005246 | A1* | 1/2018 | Basam | G06F 11/0709 |
| 2018/0060786 | A1* | 3/2018 | Venkataraman | G06Q 10/063112 |
| 2018/0108022 | A1* | 4/2018 | Bandera | G06Q 30/016 |
| 2018/0204167 | A1* | 7/2018 | Rayner | G06Q 10/06 |
| 2018/0211260 | A1* | 7/2018 | Zhang | G06N 20/00 |
| 2018/0225306 | A1* | 8/2018 | He | G10L 15/26 |
| 2018/0260760 | A1* | 9/2018 | Srivastava | G06Q 10/063118 |
| 2018/0315055 | A1* | 11/2018 | Pickover | G06Q 30/016 |
| 2018/0335900 | A1* | 11/2018 | Ramalingam | G06Q 10/00 |
| 2019/0004890 | A1* | 1/2019 | Venkataraman | G06N 20/00 |

OTHER PUBLICATIONS

Ning Chen et al., Software process evaluation: a machine learning framework with application to defect management process, May 1, 2013, [Retrieved on Jan. 1, 2019]. Retrieved from the internet: <URL: https://rd.springer.com/content/pdf/10.1007%2Fs10664-013-9254-z.pdf> 34 Pages (1531-1564) (Year: 2013).*

* cited by examiner

GENERATING AND PUBLISHING A PROBLEM TICKET

BACKGROUND

The present invention relates in general to generating and publishing a problem ticket to allow users to collaboratively resolve a problem. More specifically, the present invention can relate to a system that enables users to generate and publish a problem ticket that describes a problem that is encountered by the users in the course of developing software, for example.

When developing software, a team of users can work together to conceive, describe, design, program, and test one or more software components. During the development process, a user can encounter a technical problem that requires the attention of another qualified user to resolve. The user that encounters the problem can generate a report such as, for example, a problem ticket to describe the characteristics of the problem and the circumstances surrounding the problem. By referring to the information that is included with the problem ticket, the qualified user can attempt to reproduce the problem so that the problem can be resolved.

SUMMARY

A computer-implemented method according to one or more embodiments of the invention includes generating, by a processor of a problem-tracking system, a problem ticket. The problem ticket describes a problem encountered by a first user, and the problem ticket is assigned to at least one qualified user to resolve. The method also includes receiving additional information relating to the problem from at least one second user. The method also includes storing the received additional information in association with the problem ticket. The receiving and the storing of the additional information occurs while the problem ticket is waiting to be resolved by the at least one qualified user. The method also includes providing the stored received additional information and the problem ticket to the at least one qualified user.

A computer system according to one or more embodiments of the invention includes a memory. The computer system can also include a processor system communicatively coupled to the memory. The processor system is configured to perform a method including generating a problem ticket. The problem ticket describes a problem encountered by a first user, and the problem ticket is assigned to at least one qualified user to resolve. The method also includes receiving additional information relating to the problem from at least one second user. The method also includes storing the received additional information in association with the problem ticket. The receiving and the storing of the additional information occurs while the problem ticket is waiting to be resolved by the at least one qualified user. The method also includes providing the stored received additional information and the problem ticket to the at least one qualified user.

A computer program product according to one or more embodiments of the invention includes a computer-readable storage medium having program instructions embodied therewith. The program instructions are readable by a processor system of a problem-tracking system to cause the processor system to generate a problem ticket. The problem ticket describes a problem encountered by a first user, and the problem ticket is assigned to at least one qualified user to resolve. The processor system can also be caused to receive additional information relating to the problem from at least one second user. The processor system can also be caused to store the received additional information in association with the problem ticket. The receiving and the storing of the additional information occurs while the problem ticket is waiting to be resolved by the at least one qualified user. The processor system can also be caused to provide the stored received additional information and the problem ticket to the at least one qualified user.

BRIEF DESCRIPTION OF THE DRAWINGS

The subject matter of one or more embodiments is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
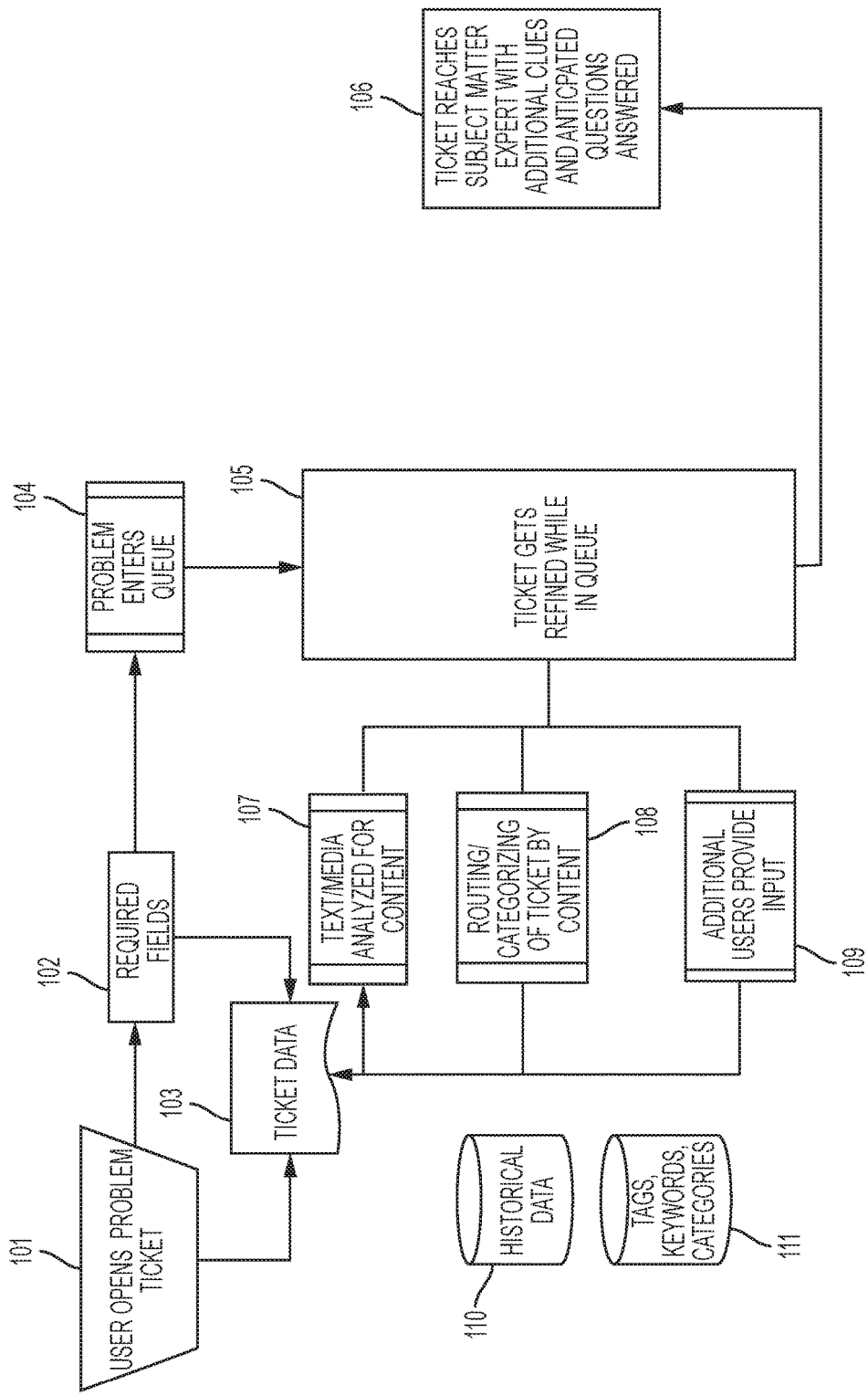
FIG. 1 illustrates a process for generating and publishing a problem ticket in accordance with one or more embodiments of the invention.

Various embodiments of the invention are described herein with reference to the related drawings. Alternative embodiments of the invention can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments of the invention whether or not explicitly described.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments of the invention or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and computing models may or may not be described in detail herein. Moreover, it is understood that the various tasks and process steps described herein can be incorporated into a more comprehensive procedure, process or system having additional steps or functionality not described in detail herein.

One or more embodiments are directed to generating and publishing a problem ticket to resolve a problem. After the problem ticket is generated, at least one specific qualified team member can be assigned to resolve the problem. While the generated problem ticket is waiting to be addressed by the qualified team member, the problem ticket can be published on an interface that allows other team members to collaboratively provide additional/supplemental information that can possibly assist the qualified team member in solving the problem. As such, different team members who work on a project together can use a system of one or more embodiments to track and resolve problems which arise in the course of completing the project. For example, in one embodiment of the present invention, a software development team can track and resolve problems which arise in the course of developing software.

With a problem-tracking system of the conventional approaches, if a user encounters a problem, the user can report the problem by generating an indication of the problem. For example, the user can generate a problem ticket, where the problem ticket describes the presence of the problem and describes characteristics of the problem.

If multiple problem tickets have been generated by the users of the system, then the problem tickets can be ordered within a queue, and each problem ticket can be assigned to one or more qualified users to resolve. Each problem ticket then remains within the queue until the qualified team member is able to resolve the problem that is associated with each problem ticket.

With the conventional approaches, when a problem ticket is awaiting to be resolved by the qualified user, the problem ticket is merely waiting to be addressed by the qualified user, and thus the problem ticket does not progress toward resolution during this time. The conventional approaches do not use this waiting time in a productive manner that progresses the problem ticket toward resolution. Additionally, with the conventional approaches, users can inadvertently submit incomplete information when generating the problem ticket. For example, the information that is submitted by the user may not be sufficient for resolving the problem of the ticket. Further, the system of the conventional approaches can possibly prompt the user to submit details that are not relevant to resolving the problem of the problem ticket.

In view of the shortcomings described above, the problem tickets that are generated by the conventional approaches generally await to be serviced by the assigned qualified user, without progressing toward resolution during this waiting time. Further, the problem tickets of the conventional approaches typically include insufficient or irrelevant information for solving the problem of the problem ticket. When the qualified user that is assigned to solve the problem ticket receives and reviews the insufficient and irrelevant information that is included with the problem ticket, the qualified user can then become frustrated when attempting to resolve the problem that is associated with the problem ticket.

In contrast to the conventional approaches, one or more embodiments can enable users to provide additional/supplemental information that is to be included with a problem ticket while the problem ticket is waiting to be resolved by the qualified user. With one or more embodiments, while the problem ticket is waiting within a queue to be addressed by a qualified user, other users can easily submit/input additional/supplemental information that can be useful to the qualified user who is ultimately assigned to solve the problem of the ticket. Once the qualified user is able to review the supplementary information, the qualified user can refer to the supplemental information to resolve the problem of the problem ticket.

As described above, with one example embodiment, a team of users can work together to develop a software application. During the course of development, suppose that a problem arises, and the problem produces an error code relating to a database that is used by the software application. Upon determining that the problem has occurred, a user can then generate a problem ticket that describes the problem and that describes the associated error code. While the problem ticket is awaiting the qualified user to address the problem, a different user such as, for example, a database expert can review the problem ticket and the database expert can possibly submit some supplementary information relating to the error code. Once the qualified user (who is assigned to resolve the problem ticket) reviews the problem ticket, the qualified user can also review the supplementary information relating to the error code.

As described above, a user can use the system of one or more embodiments to generate a problem ticket. When generating the problem ticket, the user submits information that describes the problem. With one or more embodiments, the user who generates the problem ticket can include information in the form of textual information or in the form of captured imagery information. The captured imagery information can be in the form of pictures or video. For example, the pictures or video can correspond to a screenshot of the encountered problem. With one or more embodiments of the present invention, the user who generates the problem ticket can capture and submit information to be included with the problem ticket by using the user's mobile device. As described above, when the problem ticket is generated, the problem ticket can be assigned to at least one qualified user to resolve the problem.

With one or more embodiments, while the problem ticket is waiting to be resolved by the qualified user, the system can also publish the problem ticket to a platform that is accessible by other users. As such, the other users can collaboratively contribute information to the published problem ticket. When the problem ticket is published to the platform, the problem ticket can be fit into one or more categories/tags that exist on the platform, as discussed in more detail below. The categories/tags that are associated with a problem ticket can initially be submitted by the user who generated the problem ticket. However, as described in more detail below, other users can also assign categories/tags to the problem ticket, and a cognitive system of one or more embodiments can also assign categories/tags to the problem ticket.

The platform upon which the problem ticket is published can be organized in accordance with different categories and/or different tags, which can correspond to the different categories/tags that are assigned to the problem tickets. For example, the platform can be organized around different technical categories/tags that relate to different programming languages, different entity names, different operating systems, different error types, different application types, different functions, different ways to utilize memory, etc. The categories/tags that are used by the platform can correspond to categories/tags that that are used by other social media platforms, online project hosting wikis, blogs, forums, and other technical websites. Therefore, a user who seeks to help resolve problem tickets that are published on the platform can be directed to categories/tags that correspond to the user's areas of expertise, and thus the user can contribute information relating to problem tickets that are within the user's area of expertise.

With one or more embodiments, the different users can assign different categories and/or tags to the published problem ticket. Although these users can be users who are unable to resolve the problem themselves, they can still provide information that can be helpful to the qualified user who is assigned to ultimately resolve the problem.

The system of one or more embodiments can include automated tools that assign categories and/or tags to the problem ticket. For example, if one or more users have submitted imagery to be included with the problem ticket, an automated cognitive tool can categorize the submitted imagery via pattern matching and/or machine learning. The automated cognitive tool can be implemented as a convolutional neural network, for example. Therefore, the submitted imagery can enable the problem ticket to be associated with one or more categories by the system of one or more embodiments. One or more embodiments can also perform optical character recognition on the submitted imagery to determine categories, tags, and/or keywords, for example. One or more embodiments can also determine keywords based on textual information that has been submitted for the problem ticket. These keywords can then be associated with the problem ticket. The submitted textual information can also be configured to be searchable by other users.

The system of one or more embodiments can compare the imagery submitted with a problem ticket against other imagery that may be able to help provide resolution or additional context to the problem. Specifically, one or more embodiments can determine similarities between the imagery submitted with the problem ticket and other imagery that may be able to help provide resolution/context. For example, if the imagery of a problem ticket matches a previous image that was previously published on the platform, then one or more embodiments can determine whether the previous image was associated with any categories/tags, and these possible categories/tags of the previous image can also be assigned to the current problem ticket. The problem ticket can be analyzed using cognitive tools to extract any other textual clues or image context that are present within the problem ticket. The extracted textual clues and/or image context can then be provided to users in order to help the users to identify key elements within the problem ticket.

The system of one or more embodiments can also use cognitive functionality to leverage machine-learning and/or pattern-matching abilities. By leveraging these abilities, one or more embodiments can also automate certain aspects of submitting information for the ticket. For example, by analyzing information that has been included with the problem ticket, one or more embodiments can determine information such as, but not limited to, an operating system that the user is using, the relevant software that the user is using, a relevant program version of the software that is being utilized, an error code that has been encountered, etc. Such determined information can also be automatically included with the problem ticket. As such, one or more embodiments can allow a user to avoid the process of entering certain data, where the user can consider the data-entry process of such data to be a tedious process.

One or more embodiments can use Application Program Interfaces (APIs) and/or web services to extract entity names from the information that is included with the problem ticket. These extracted entity names can be used to categorize/tag the problem ticket when publishing the problem ticket upon the above-described platform. One or more embodiments can extract entity names from Uniform Resource Locators (URLs), from Hypertext Markup Language (HTML) files, and from textual content. One or more embodiments can extract meta-data from the information that is included with the problem ticket. The extracted meta-data can be in Extensible Markup Language (XML) and/or JavaScript Object Notation (JSON) formats.

Once meta-data is extracted from the information that is included with the problem ticket, the system of one or more embodiments can compare the extracted information against an aggregation of information that corresponds to previous error messages and previous searches. The system can compare the locations, the inputs, the position, and any other fields between the information extracted from the problem ticket and the aggregation of information that corresponds to previous error messages/searches. For example, if aspects of the extracted information match aspects of the aggregated information, then one or more embodiments can determine categories/tags of the aggregated information, and these categories/tags of the aggregated information can also be assigned to the current problem ticket.

The information that is included with a problem ticket can also be used to help route a request regarding the problem ticket to users who may be able to provide additional supplemental information to include with the problem ticket. For example, if information of a current problem ticket is determined to be similar to information of another problem ticket that was previously solved by a previously qualified individual, the system can request input from the previously qualified individual.

As described above, problem tickets can be time consuming and complex to resolve. The process of resolving the problems relating to the problem tickets generally requires accurate, unambiguous communication, and access to different sets of knowledge and experiences. As such, one or more embodiments of the invention can automate and enhance much of the data entry process of problem solving. One or more embodiments can allow users to easily add potentially helpful input during the time when the problem ticket is awaiting the qualified user to address the problem.

FIG. 1 illustrates a process for generating and publishing a problem ticket in accordance with one or more embodiments of the invention. At 101, a user of the system can encounter a problem and can thus generate a problem ticket. Upon generating the problem ticket, at 102, the user can submit information to fill some required fields of the problem ticket. However, as discussed above, one or more embodiments can autofill some required fields of the problem ticket. Once the problem ticket is generated, one or more embodiments can extract information from the ticket data at 103. Also, once the problem ticket is generated, at 104, the problem ticket can enter a queue to await a qualified user to resolve the problem. At 105, supplementary information can be added to the problem ticket while the problem ticket is awaiting resolution by the qualified user. For example, at 107, one or more embodiments can analyze textual or imagery content that has been included with the problem ticket. As described above, the textual/imagery content can be analyzed by automated cognitive systems that can perform optical character recognition or other analysis techniques. By analyzing the textual/imagery content, one or more embodiments can determine keywords, tags, categories, contextual information, entity names, error codes, etc., that can be helpful to the qualified user. These keywords, tags, categories, etc., can be stored in conjunction with the problem ticket, and can also be stored as aggregated information that is accessible to the system at 111 or at 110. At 108, one or more embodiments can route or categorize the problem ticket. For example, as described above, one or more embodiments can publish the problem ticket to an interface under one or more technical categories that can be reviewed by other users. Information relating to the problem ticket can also be compared against historical data 110 to determine if any other user has previously resolved a problem that is similar to the problem described by the problem ticket. At 109, different users can provide additional supplementary information that can be included with the problem ticket. At 106, the queued problem ticket can finally reach the qualified user, and the qualified user can review the additional supplementary information and any other information that has been stored with the problem ticket. The qualified user can use such information to resolve the problem.

Figure 2:
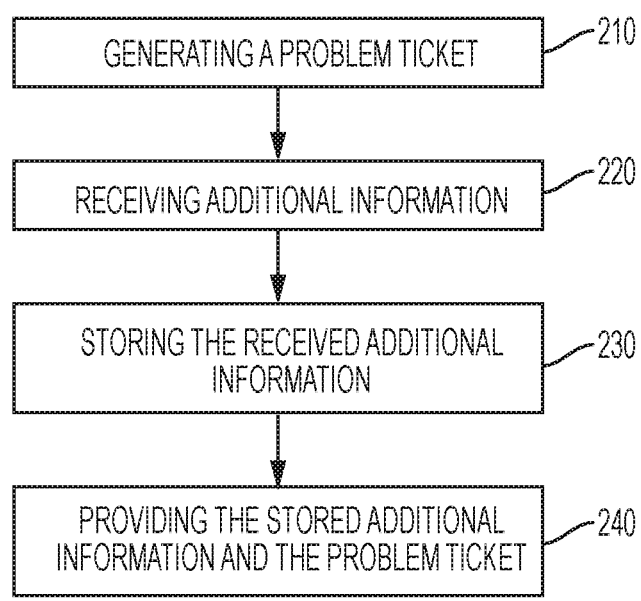
FIG. 2 depicts a flowchart of a method in accordance with one or more embodiments of the invention.

FIG. 2 depicts a flowchart of a method in accordance with one or more embodiments of the invention. The method of FIG. 2 can be performed by a controller of a problem-tracking system that is configured to generate and publish a problem ticket. The method includes, at block 210, generating, by a processor of a problem-tracking system, a problem ticket. The problem ticket describes a problem encountered by a first user, and the problem ticket is assigned to at least one qualified user to resolve. The method also includes, at block 220, receiving additional information relating to the problem from at least one second user. The method also includes, at block 230, storing the received additional information in association with the problem ticket. The receiving and the storing of the additional information occurs while the problem ticket is waiting to be resolved by the at least one qualified user. The method also includes, at 240, providing the stored received additional information and the problem ticket to the at least one qualified user.

Figure 3:
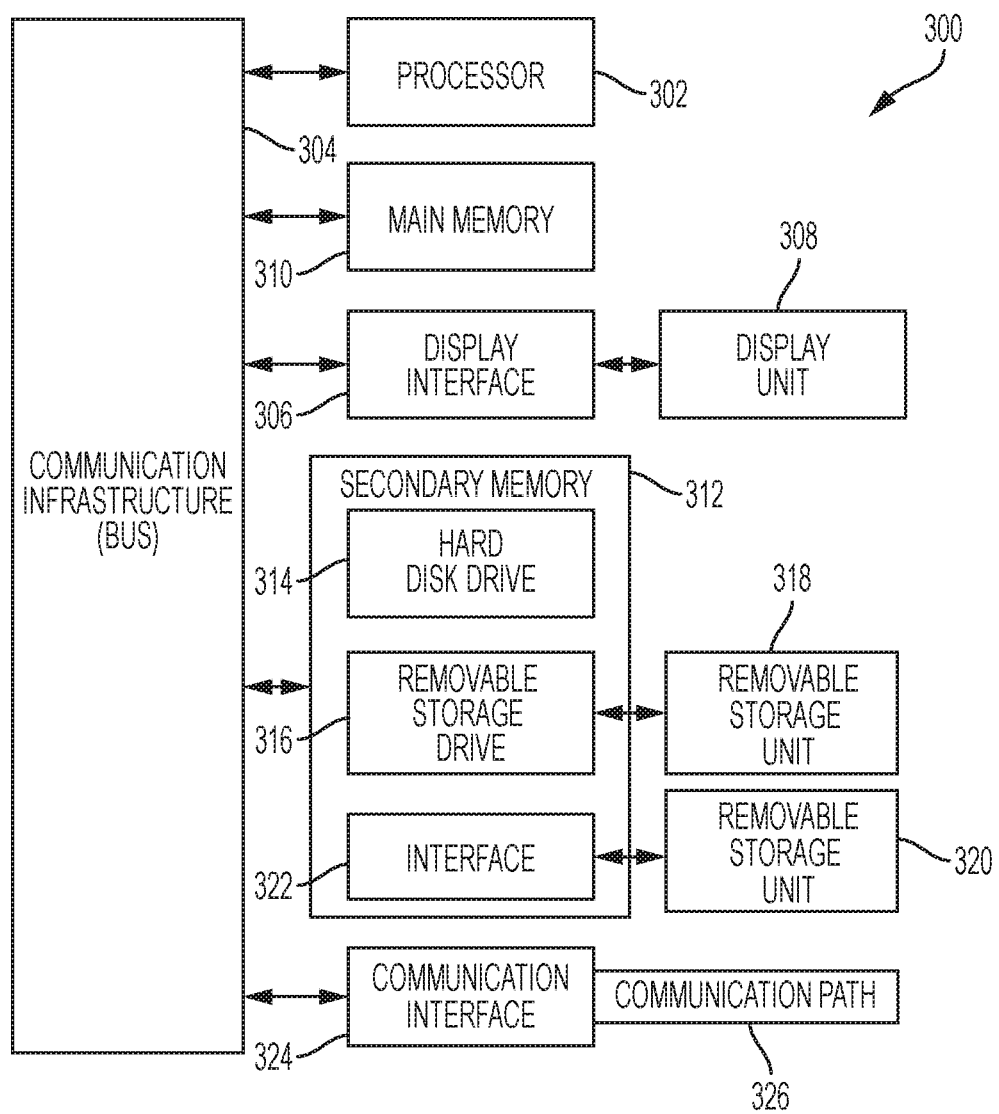
FIG. 3 depicts a high-level block diagram of a computer system, which can be used to implement one or more embodiments of the invention.

FIG. 3 depicts a high-level block diagram of a computer system 300, which can be used to implement one or more embodiments of the invention. Computer system 300 can be a part of an overall problem-tracking system. Computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments of the invention, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via a communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the foregoing detailed description that one or more embodiments of the invention provide technical benefits and advantages.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

Figure 4:
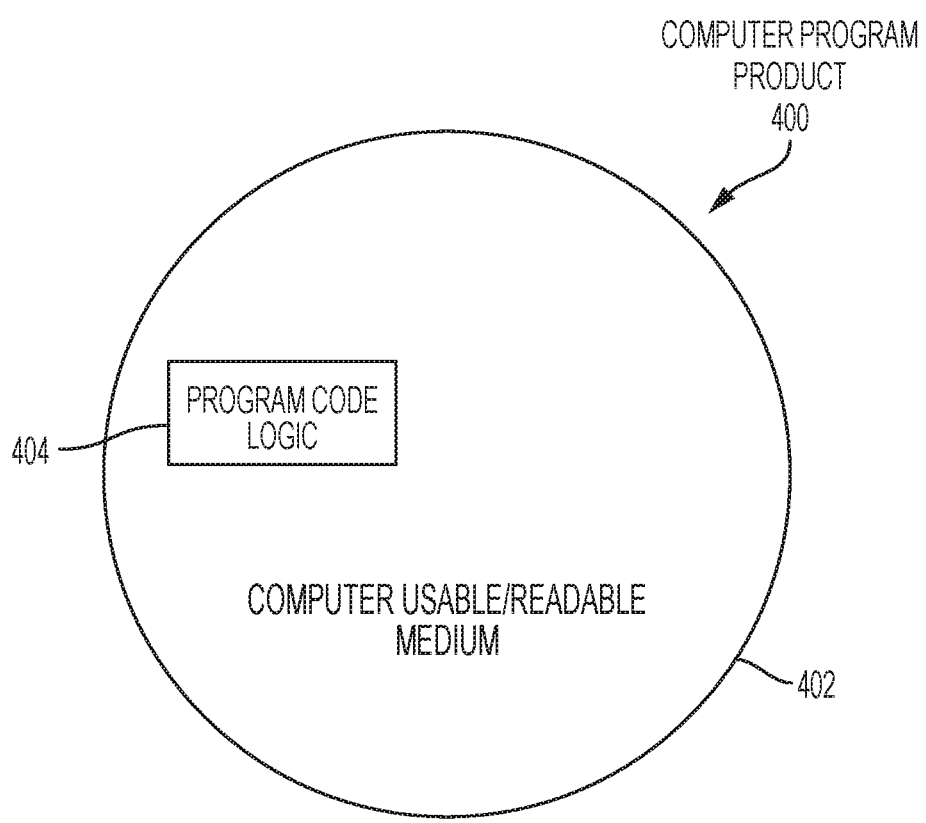
FIG. 4 depicts a computer program product, in accordance with an embodiment of the invention.

FIG. 4 depicts a computer program product 400, in accordance with an embodiment of the invention. Computer program product 400 includes a computer-readable storage medium 402 and program instructions 404.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the invention, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating, by a processor of a problem-tracking system, a problem ticket, wherein the problem ticket describes a problem encountered by a first user, and the problem ticket is assigned to at least one qualified user to resolve;
extracting, by the processor and using an application program interface (API), entity names from information included with the problem ticket;
assigning an image from a previous problem ticket to the problem ticket, wherein the image from the previous problem ticket is determined to be similar to an image submitted with the problem ticket;
assigning a tag, category, or keyword applicable to the problem based in part on the entity names and machine learning-based analysis of the image from the previous problem ticket;
receiving additional information relating to the problem from at least one second user;
storing the received additional information in association with the problem ticket, wherein the receiving and the storing of the additional information occurs while the problem ticket is awaiting to be resolved by the at least one qualified user; and
providing the stored received additional information, the tag, category, or keyword, and the problem ticket to the at least one qualified user.

2. The computer-implemented method of claim 1, wherein the problem corresponds to a software development problem.

3. The computer-implemented method of claim 2, wherein receiving additional information comprises receiving imagery or textual information, and the imagery or textual information is received from a mobile device of the at least one second user.

4. The computer-implemented method of claim 3, further comprising publishing the problem ticket to a platform based on the determined tag, category, or keyword, wherein the platform that is accessible by the at least one second user.

5. The computer-implemented method of claim 4, wherein the tag, category, or keyword is determined by a convolutional neural network of the problem-tracking system.

6. The computer-implemented method of claim 5, further comprising extracting an entity name by using an application program interface.

7. A computer system of a problem-tracking system comprising:
a memory; and
a processor system communicatively coupled to the memory;
the processor system configured to perform a method comprising:
generating a problem ticket, wherein the problem ticket describes a problem encountered by a first user, and the problem ticket is assigned to at least one qualified user to resolve;
extracting, by the processor and using an application program interface (API), entity names from information included with the problem ticket;
assigning an image from a previous problem ticket to the problem ticket, wherein the image from the previous problem ticket is determined to be similar to an image submitted with the problem ticket;
assigning a tag, category, or keyword applicable to the problem based in part on the entity names and machine learning-based analysis of the image from the previous problem ticket;
receiving additional information relating to the problem from at least one second user;
storing the received additional information in association with the problem ticket, wherein the receiving and the storing of the additional information occurs while the problem ticket is awaiting to be resolved by the at least one qualified user; and
providing the stored received additional information, the tag, category, or keyword, and the problem ticket to the at least one qualified user.

8. The computer system of claim 7, wherein the problem corresponds to a software development problem.

9. The computer system of claim 7, wherein receiving additional information comprises receiving imagery or textual information, and the imagery or textual information is received from a mobile device of the at least one second user.

10. The computer system of claim 9, wherein the method further comprises publishing the problem ticket to a platform based on the determined tag, category, or keyword, wherein the platform that is accessible by the at least one second user.

11. The computer system of claim 10, wherein the tag, category, or keyword is determined by a convolutional neural network of the problem-tracking system.

12. The computer system of claim 11, wherein the method further comprises extracting an entity name by using an application program interface.

13. A computer program product comprising a computer-readable storage medium having program instructions embodied therewith, the program instructions readable by a processor system to cause the processor system to:
generate a problem ticket, wherein the problem ticket describes a problem encountered by a first user, and the problem ticket is assigned to at least one qualified user to resolve;

extract, by the processor and using an application program interface (API), entity names from information included with the problem ticket;

assign an image from a previous problem ticket to the problem ticket, wherein the image from the previous problem ticket is determined to be similar to an image submitted with the problem ticket;

assign a tag, category, or keyword applicable to the problem based in part on the entity names and machine learning-based analysis of the image from the previous problem ticket;

receive additional information relating to the problem from at least one second user;

store the received additional information in association with the problem ticket, wherein receiving and storing of the additional information occurs while the problem ticket is awaiting to be resolved by the at least one qualified user; and provide the stored received additional information, the tag, category, or keyword, and the problem ticket to the at least one qualified user.

14. The computer program product of claim 13, wherein the problem corresponds to a software development problem.

15. The computer program product of claim 14, wherein the receiving additional information comprises receiving imagery or textual information, and the imagery or textual information is received from a mobile device of the at least one second user.

16. The computer program product of claim 15, wherein the program instructions further cause the processor system to publish the problem ticket to a platform based on the determined tag, category, or keyword, wherein the platform that is accessible by the at least one second user.

17. The computer program product of claim 16, wherein the tag, category, or keyword is determined by a convolutional neural network of a problem-tracking system.

* * * * *